United States Patent
Hirakata (12)

(10) Patent No.: US 8,627,841 B2
(45) Date of Patent: Jan. 14, 2014

(54) STORAGE TANK SYSTEM AND METHOD OF DECOMPRESSING THE STORAGE TANK SYSTEM

(75) Inventor: Shuji Hirakata, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1085 days.

(21) Appl. No.: 12/307,501

(22) PCT Filed: Jul. 11, 2007

(86) PCT No.: PCT/IB2007/001936
§ 371 (c)(1),
(2), (4) Date: Jan. 5, 2009

(87) PCT Pub. No.: WO2008/010045
PCT Pub. Date: Jan. 24, 2008

(65) Prior Publication Data
US 2009/0288713 A1     Nov. 26, 2009

(30) Foreign Application Priority Data

Jul. 12, 2006   (JP) ................................. 2006-191556

(51) Int. Cl.
*F16K 17/38*     (2006.01)
(52) U.S. Cl.
USPC .............................................. 137/80; 137/73
(58) Field of Classification Search
USPC ............... 137/79, 80, 72, 73, 74; 429/400
See application file for complete search history.

(56) References Cited

U.S. PATENT DOCUMENTS

| 2,564,295 | A | * | 8/1951 | Benz et al. ...................... 137/80 |
| 3,582,615 | A | * | 6/1971 | Schippers et al. ............. 219/471 |
| 5,042,520 | A | * | 8/1991 | Reznik ............................ 137/79 |
| 5,522,428 | A |   | 6/1996 | Duvall |
| 5,848,604 | A |   | 12/1998 | Eihusen |
| 6,382,232 | B1 | * | 5/2002 | Portmann .................. 137/68.13 |
| 6,786,245 | B1 | * | 9/2004 | Eichelberger et al. ............ 141/4 |
| 7,743,785 | B2 | * | 6/2010 | Rohwer et al. .................. 137/79 |

FOREIGN PATENT DOCUMENTS

| CA | 2 425 851 A1 | 4/2003 |
| DE | 602 08 563 T2 | 7/2006 |
| EP | 0 235 693 B1 | 9/1987 |
| EP | 0 978 297 A2 | 2/2000 |
| EP | 1 239 202 A2 | 9/2002 |
| EP | 1 655 533 A1 | 5/2006 |
| GB | 2 252 163 A | 7/1992 |
| JP | 26-6447 U | 6/1951 |
| JP | 2000-230849 A | 8/2000 |

(Continued)

OTHER PUBLICATIONS

Tranlsation of abstract for 2003-0092281 (Patent Application No. 10-2002-0029895).*

(Continued)

*Primary Examiner* — Craig Schneider
(74) *Attorney, Agent, or Firm* — Kenyon & Kenyon LLP

(57) ABSTRACT

A tank system includes a high-pressure tank, a detection unit for detecting a temperature increase in at least a portion of the high-pressure tank, a decompression unit for decompressing the high-pressure tank, and a control unit for controlling the decompression unit to decompress the high-pressure tank when a temperature increase in at least a part of the high-pressure tank is detected by the detection unit.

10 Claims, 8 Drawing Sheets

(56) References Cited

FOREIGN PATENT DOCUMENTS

| | | |
|---|---|---|
| JP | 2001-283343 A | 10/2001 |
| JP | 2002-195499 A | 7/2002 |
| JP | 2003-270056 A | 9/2003 |
| JP | 2004-204956 A | 7/2004 |
| JP | 2005-069417 A | 3/2005 |
| JP | 2005-315294 A | 11/2005 |
| KR | 2003-92281 A | 12/2003 |
| KR | 0575349 B | 5/2006 |
| WO | WO 2004/014683 A1 | 2/2004 |

OTHER PUBLICATIONS

Office Action issued Jun. 21, 2011 in JP 2006-191556 and English translation thereof.

* cited by examiner

STORAGE TANK SYSTEM AND METHOD OF DECOMPRESSING THE STORAGE TANK SYSTEM

This is a 371 national phase application of PCT/IB2007/001936 filed 11 Jul. 2007, claiming priority to Japanese Patent Application No. 2006-191556 filed 12 Jul. 2006, the contents of which are incorporated herein by reference.

BACKGROUND OF THE INVENTION

1. Field of Invention

The present invention relates to a tank system and a decompression method for the tank system.

2. Description of Related Art

A tank for storing gas or liquid contents under high-pressure is equipped with a safety valve to prevent the tank from rupturing. Examples of safety valves known in the art include a spring type safety valve to prevent pressure in the tank from exceeding an allowable pressure, and a fusible-plug type safety valve to release the tank contents to the atmosphere before the temperature of the tank exceeds an allowable temperature.

Proposed methods for reducing the pressure in a tank before the temperature of the tank exceeds an allowable temperature include methods using an improved fusible-plug type safety valve and a valve other than a fusible-plug type safety valve (for example, see Japanese Patent Application Publication No. JP-A-2005-69417, Japanese Utility Model Application Publication No. JP-U-26-6447, Japanese Patent Application Publication No. JP-A-2001-283343, and Japanese Patent Application Publication No. JP-A-2005-315294).

However, according to the related art, the temperature of the tank is detected only at one location; thus, when a local temperature increase occurs in the high-pressure tank, heat due to the local temperature increase may not be transmitted to the location where the temperature of the tank is detected due to the influence of the outside air temperature or the like, so that the tank may not be decompressed.

SUMMARY OF THE INVENTION

The present invention provides a tank system that detects a temperature increase in at least a part of a high-pressure tank and reduces the pressure in the tank without being affected by the outside air temperature, and a decompression method for the tank system.

According to a first aspect of the present invention, detection means for detecting a temperature increase in at least a portion of a high-pressure tank is provided, and upon detecting a temperature increase of the high-pressure tank, decompression means is controlled to decompress the high-pressure tank. This makes it possible to detect a temperature increase in at least a part of the high-pressure tank, and reduce the pressure in the tank without being affected by the outside air temperature.

Specifically, there is provided a tank system including: a high-pressure tank; detection means for detecting a temperature increase in at least a part of the high-pressure tank; decompression means for decompressing the high-pressure fuel tank; and control means for controlling the decompression means to decompress the high-pressure tank when the temperature increase in at least a part of the high-pressure tank is detected by the detection means.

The above-described tank system is configured such that even a temperature increase occurring only in a part of the high-pressure tank is detected, and the control means controls the decompression means to decompress the high-pressure tank. Therefore, it is possible to detect a temperature increase in at least a part of the high-pressure tank, and reduce the pressure in the tank without being affected by the outside air temperature.

In the tank system described above, the detection means detects the temperature increase in at least a part of the high-pressure tank from a temperature of the high-pressure tank at two locations or more.

The above-mentioned tank system may be configured such that the detection means has a heat-fusible conductive wire arranged to surround the periphery of the high-pressure tank, and when the heat-fusible conductive wire is broken, the detection means detects that a temperature increase has occurred in at least a portion of the high-pressure tank, and the control means controls the decompression means to decompress the high-pressure tank.

That is, in order to detect a temperature increase in at least a portion of the high-pressure tank, a heat-fusible conductive wire that is fused due to the temperature increase is provided to cover the surface of the high-pressure tank. The energization state of the heat-fusible conductive wire is measured, and when energization ceases due to wire breakage, it is determined that a temperature increase has occurred in at least a portion of the high-pressure tank. This makes it possible to detect a temperature increase in at least a portion of the high-pressure tank without being affected by the outside air temperature.

The above-mentioned tank system may be configured such that the detection means has at least two thermistors arranged on a surface of the high-pressure tank, and the detection means compares temperatures detected by the thermistors with each other, and detects that a temperature increase has occurred in at least a portion of the high-pressure tank when there is a temperature difference, and the control means controls the decompression means to decompress the high-pressure tank.

That is, in order to detect a temperature increase in at least a portion of the high-pressure tank, thermistors for detecting temperature are provided in at least two locations on the surface of the high-pressure tank. The resistance value of the thermistor is measured, and the temperatures of the respective thermistors are compared with each other. If there is a difference in temperature between the respective thermistors, it is determined that a temperature increase has occurred in at least a portion of the tank. This is because the temperature distribution across the surface of the high-pressure tank is not uniform if a local temperature increase occurs in the high-pressure tank. This makes it possible to detect a temperature increase in at least a part of the high-pressure tank without being affected by the outside air temperature.

The above-mentioned tank system may be configured such that the tank system is mounted in a vehicle and further includes collision sensing means for detecting a collision of the vehicle, and that the control means increases detection sensitivity of the detection means if a collision of the vehicle is detected.

When a vehicle incorporating a tank system is in a collision, there is a greater risk that the high-pressure tank will be exposed to high temperature. Accordingly, the detection sensitivity of the detection means is increased upon collision of a vehicle against an obstacle or the like. This makes it possible to detect a temperature increase of the high-pressure tank at an early stage.

The above-mentioned tank system may be configured such that the tank system is mounted in a vehicle and further includes temperature sensing means for detecting a temperature of at least a part of the vehicle, and that the control means increases detection sensitivity of the detection means when the temperature sensing means detects that the temperature of at least a part of the vehicle exceeds a predetermined temperature.

Generally, a vehicle is equipped with a large number of temperature sensing means such as an outside-temperature sensor, a tire-temperature sensor, and a catalyst-temperature sensor. Accordingly, the detection sensitivity of the detection means is set to increase when signals from these temperature sensing means are input to the control means and the temperature sensing means detects an abnormally high temperature, for example. This makes it possible to detect a temperature increase of the high-pressure tank at an early stage. It should be noted that the predetermined temperature refers to a high temperature that would not be reached if the fuel cell, the drive motor, and the like were operating normally.

The above-mentioned storage tank system may be configured such that the storage tank system further includes a pressure sensing means for detecting the pressure in the high-pressure tank, and after detecting a temperature increase in at least a portion of the high-pressure tank, the control means controls the decompression means to decompress the high-pressure tank when the detected internal pressure is equal to or higher than a first threshold pressure.

There are cases where even though the temperature of the high-pressure tank has increased to cause a decrease in strength, decompression is not necessary because the pressure in the tank is low. Further, when relying solely on the detection means, there are cases where, for example, unnecessary decompression may be performed due to erroneous detection or the like. From the viewpoints of economy and influence on the surrounding environment, it is not preferable to release the contents of the tank even in such situations.

In view of this, pressure sensing means for detecting the pressure in the high-pressure tank may be further provided so that when a temperature increase in at least a part of the high-pressure tank is detected, and the internal pressure of the high-pressure tank becomes equal to or higher than a first threshold pressure, the decompression means is controlled to decompress the high-pressure tank. According to the tank system configured in this way, it is possible to prevent unnecessary release of the tank contents due to erroneous detection of the detection means. It should be noted that the first threshold pressure refers to a pressure within the high-pressure tank, and is defined as a pressure that may cause the tank to rupture if a local temperature increase occurs in the high-pressure tank in a state with the internal pressure of the high-pressure tank maintained.

The above-mentioned tank system may be configured such that after controlling the decompression means to decompress the high-pressure tank, the control means controls the decompression means to stop the decompression of the high-pressure tank when the pressure sensing means detects that an internal pressure of the high pressure tank has become equal to or lower than a second threshold pressure.

That is, even though the pressure in the tank is higher than the first threshold pressure when decompression of the tank is started, the pressure in the tank gradually decreases as the decompression of the tank progresses. From the viewpoints of economy and influence on the surrounding environment, it is not preferable to continue the release of the contents of the tank beyond the point where the pressure in the tank has been sufficiently reduced to a pressure at or below which decompression is no longer necessary.

Accordingly, when the pressure in the high-pressure tank becomes equal to or lower than the second threshold pressure, the decompression means is controlled to stop the decompression of the high-pressure tank. According to the tank system configured in this way, it is possible to prevent unnecessary release of the tank contents. It should be noted that the second threshold pressure refers to a pressure in the high-pressure tank, and is defined as a pressure that does not likely to cause tank burst even if a local temperature increase occurs in a portion of the high-pressure tank in a state with the internal pressure of the high-pressure tank maintained.

The above-mentioned tank system may be configured such that the decompression means has a fusible plug valve, and heating means for heating the fusible plug valve, and that the control means decompresses the high-pressure tank by heating the fusible plug valve to fuse the fusible plug valve.

A fusible plug valve is fused to open when exposed to high temperature. Meanwhile, the present invention aims at detecting a local temperature increase in the high-pressure tank to decompress the tank, and hence the functions to be accomplished by both are similar. Accordingly, the decompression means is configured to include a fusible plug valve that is fused when heated. This makes it possible to decompress the tank upon a temperature increase of the high-pressure tank, even when the control means of the tank system is inactive.

A second aspect of the present invention provides a decompression method for a tank system that includes: detecting a temperature increase in at least a portion of a high-pressure tank; and decompressing the high-pressure tank when the temperature increase in at least a part of the high-pressure tank is detected.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Example embodiment of the present invention will be described below. It is to be understood that the embodiments described below are only examples, and the present invention is not limited to the example embodiments.

Figure 1:
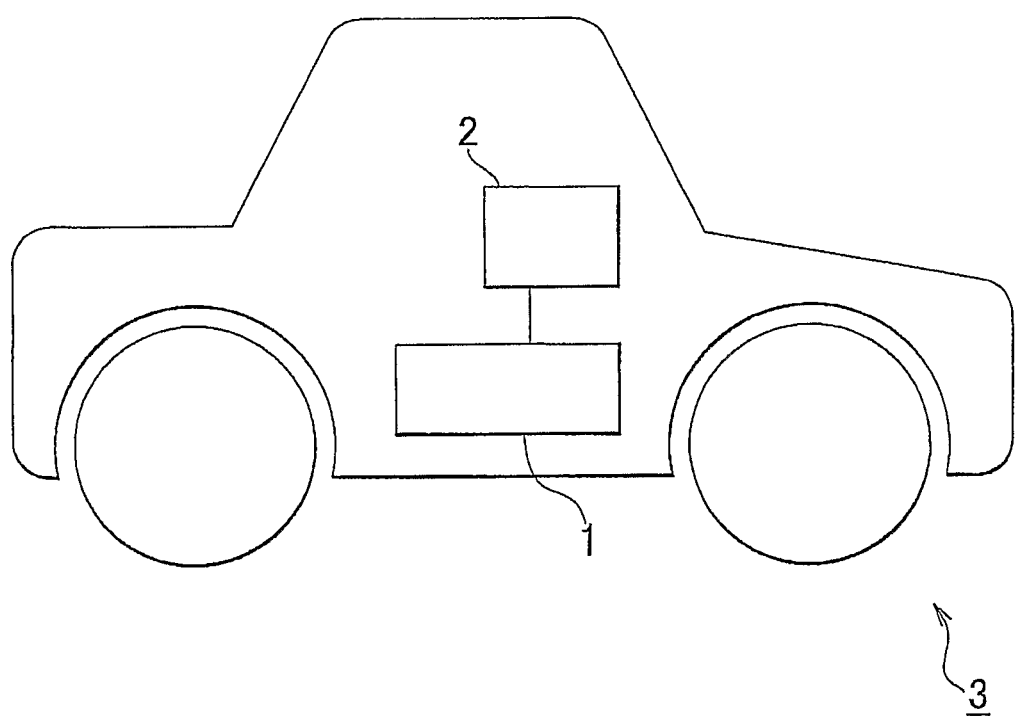
FIG. 1 is a schematic diagram of a vehicle according to the first embodiment.

FIG. 1 is a schematic diagram of a vehicle 3 that incorporates a tank system 1 according to the first embodiment and a fuel cell 2. The effect of the present invention may be more effectively attained if the tank system according to the present invention is applied to a tank for storing hydrogen gas that serves as fuel gas for a fuel cell vehicle. This is because a tank installed in a vehicle is more likely to be exposed to unexpected environmental changes as compared with a tank installed on the ground. Accordingly, in the first embodiment, it is assumed that the tank system 1 is mounted in a fuel cell vehicle 3, and stores hydrogen gas that serves as fuel gas for the fuel cell 2. Of course, the tank system according to the present invention may be also installed on the ground.

Figure 2:
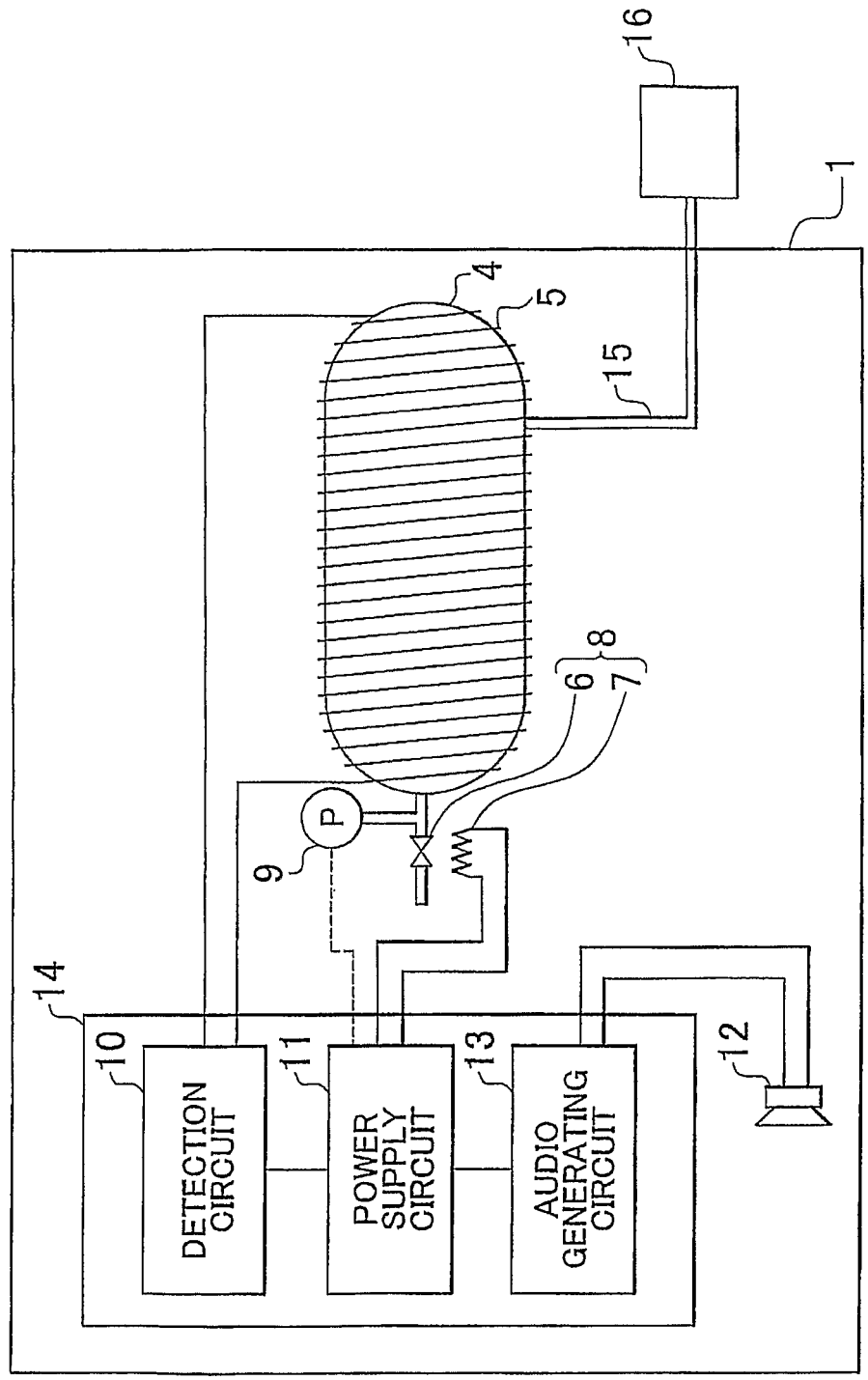
FIG. 2 is a schematic diagram of a tank system according to the first embodiment.

FIG. 2 is a schematic diagram of the tank system 1 according to the first embodiment. As shown in FIG. 2, a single heat-fusible conductive wire 5 (corresponding to the "detection means" according to the present invention) for detecting a rise in the temperature of a high-pressure tank 4 is wound to cover the surface of the high-pressure tank 4. The high-pressure tank 4 has a decompression device 8 (corresponding to the "decompression means" according to the present invention) including a fusible plug valve 6 for reducing a pressure in the high-pressure tank 4 and an electric heater 7 (corresponding to the "heating means" according to the present invention), and an electric pressure gauge 9 for detecting a pressure in the high-pressure tank 4. Further, a control device 14 (corresponding to the "control means" according to the present invention) including a detection circuit 10 connected to the heat-fusible conductive wire 5, a power supply circuit 11 connected to the electric heater 7 and the electric pressure gauge 9, and an audio generating circuit 13 connected to a speaker 12 may be attached to the high-pressure tank 4. A fuel cell 16 is connected to a path 15 located on the downstream side of the high-pressure tank 4.

The control device 14 outputs signals to the electric heater 7 and the speaker 12 in response to inputs from the heat-fusible conductive wire 5 and the electric pressure gauge 9. While it is assumed in the first embodiment that each of the detection circuit 10, power supply circuit 11, and audio generating circuit 13 in the control device 14 is formed by an electrical circuit, it may be formed by a computer including a CPU (Central Processing Unit) or memory, an input/output interface (I/O), and the like. Upon detecting a temperature increase in at least a part of the tank (in particular, when the temperature in or near the tank surface is equal to or higher than the allowable temperature for the tank or a threshold temperature corresponding to the allowable temperature), the control device 14 sends an electrical signal to the actuator (electric heater 7) to forcibly actuate the decompression means to decompress the high-pressure tank 4.

Figure 3:
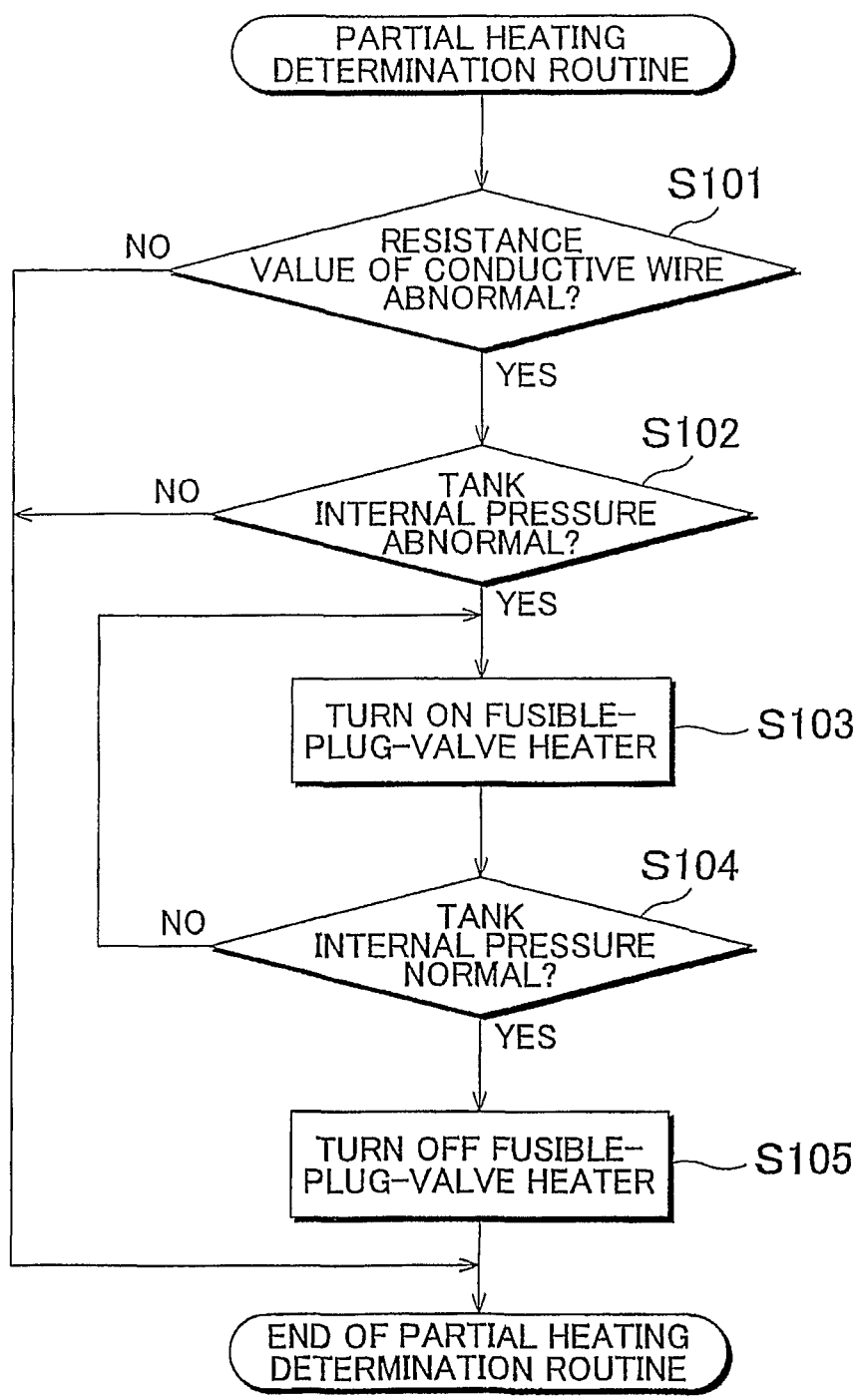
FIG. 3 is a control flow chart of the tank system according to the first embodiment.
Figure 4:
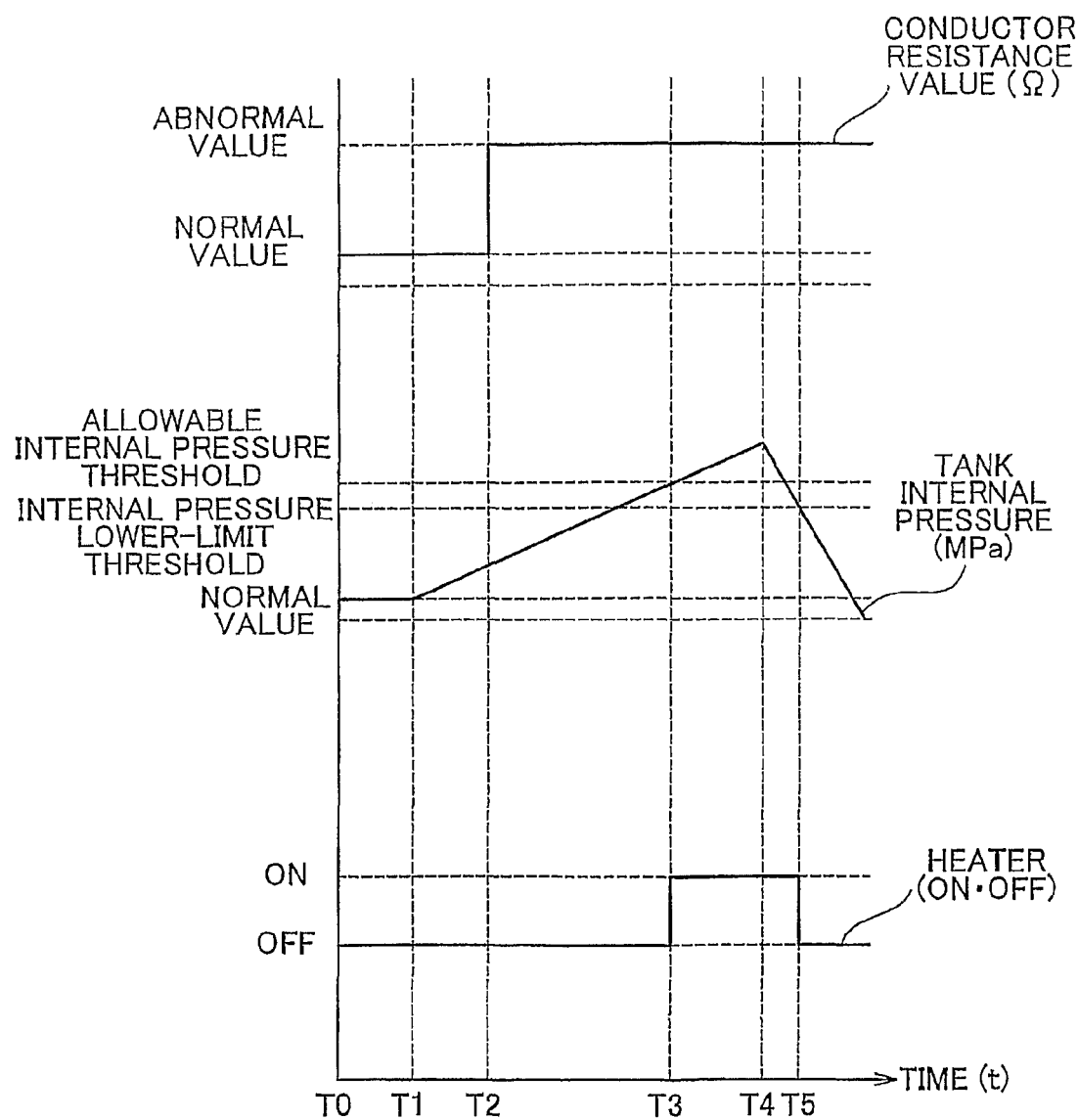
FIG. 4 is a graph showing how the resistance value of a heat-fusible conductive wire, the internal pressure of a high-pressure tank, and the energization state of an electric heater change with the passage of time in the tank system according to the first embodiment.

A method of controlling the tank system 1 configured as described above will now be described in detail. The respective controls described below are realized by cooperation between the detection circuit 10 and the power supply circuit 11 within the control device 14. FIG. 3 is a flow chart showing the control of the tank system 1. FIG. 4 is a graph showing how the resistance value of the heat-fusible conductive wire 5, the internal pressure of the high-pressure tank 4, and the energization state of the electric heater 7 change with the passage of time.

When the tank system 1 is started (time "T0" in FIG. 4; the same applies hereinafter), the control device 14 causes a current to flow in the heat-fusible conductive wire 5 connected to the detection circuit 10, and measures the resistance value of the heat-fusible conductive wire 5 (step S101 in FIG. 3; the same applies hereinafter). When the temperature of the high-pressure tank 4 rises (T1), and the heat-fusible conductive wire 5 is fused and eventually broken (T2), the conductor resistance value of the heat-fusible conductive wire 5 changes. Specifically, the resistance changes from approximately 0Ω, which indicates a normal value, to approximately ∞Ω, which indicates an abnormal value. The control device 14 thus determines that a temperature increase has occurred in at least a part of the high-pressure tank 4, and the process proceeds to the next step (S102).

When the heat-fusible conductive wire 5 is broken, the control device 14 checks the internal pressure of the high-pressure tank 4 by means of the electric pressure gauge 9 (S102). If the internal pressure of the high-pressure tank 4 is below a first threshold pressure, the control device 14 determines that decompression of the tank is unnecessary. On the other hand, if the internal pressure of the high-pressure tank 4 is equal to or higher than the first threshold pressure (allowable internal pressure threshold), the control device 14 determines that decompression of the tank is necessary. It should be noted that the first threshold pressure refers to a pressure within the high-pressure tank 4, which in the first embodiment is defined as a pressure that can cause tank burst if a local temperature increase occurs in a part of the high-pressure tank 4 in a state with the internal pressure of the high-pressure tank 4 maintained.

If the control device 14 determines in step S102 that decompression of the tank is necessary, the control device 14 energizes the electric heater 7 (T3) to heat and fuse the fusible plug valve 6, and causes an alert sound to be produced from the speaker 12 (S103). As the fusible plug valve 6 is heated and fused, the high-pressure tank 4 is decompressed (T4).

After energizing the electric heater 7, the control device 14 checks the internal pressure of the high-pressure tank 4 by the electric pressure gauge 9 (step S104). If the internal pressure of the high-pressure tank 4 is equal to or higher than the first threshold pressure, the control device 14 continues the energization of the electric heater 7 (S103). On the other hand, if the internal pressure of the high-pressure tank 4 is a pressure slightly lower than the first threshold pressure (if it is at the "internal pressure lower-limit threshold" shown in the graph of FIG. 4), the control device 14 determines that the fusible plug valve 6 has been opened, and stops (T5) the energization of the electric heater 7 (S105).

As described above, with the tank system 1 according to the first embodiment, it is possible to detect a temperature increase in at least a part of the high-pressure tank 4, and reduce the pressure in the tank without being affected by the outside air temperature. Further, when the contents of the tank are released, an alert in the form of a sound is issued at the time of release of the contents of the tank, thus warning people in the vicinity.

In the first embodiment, the tank system includes the speaker 12 and the audio generating circuit 13, and an alert sound is produced simultaneously with the energization of the electric heater 7. However, the present invention is not limited to this. That is, the alert may be made in the form of an indicator lamp or the like, or such alert means may be omitted.

Figure 5:
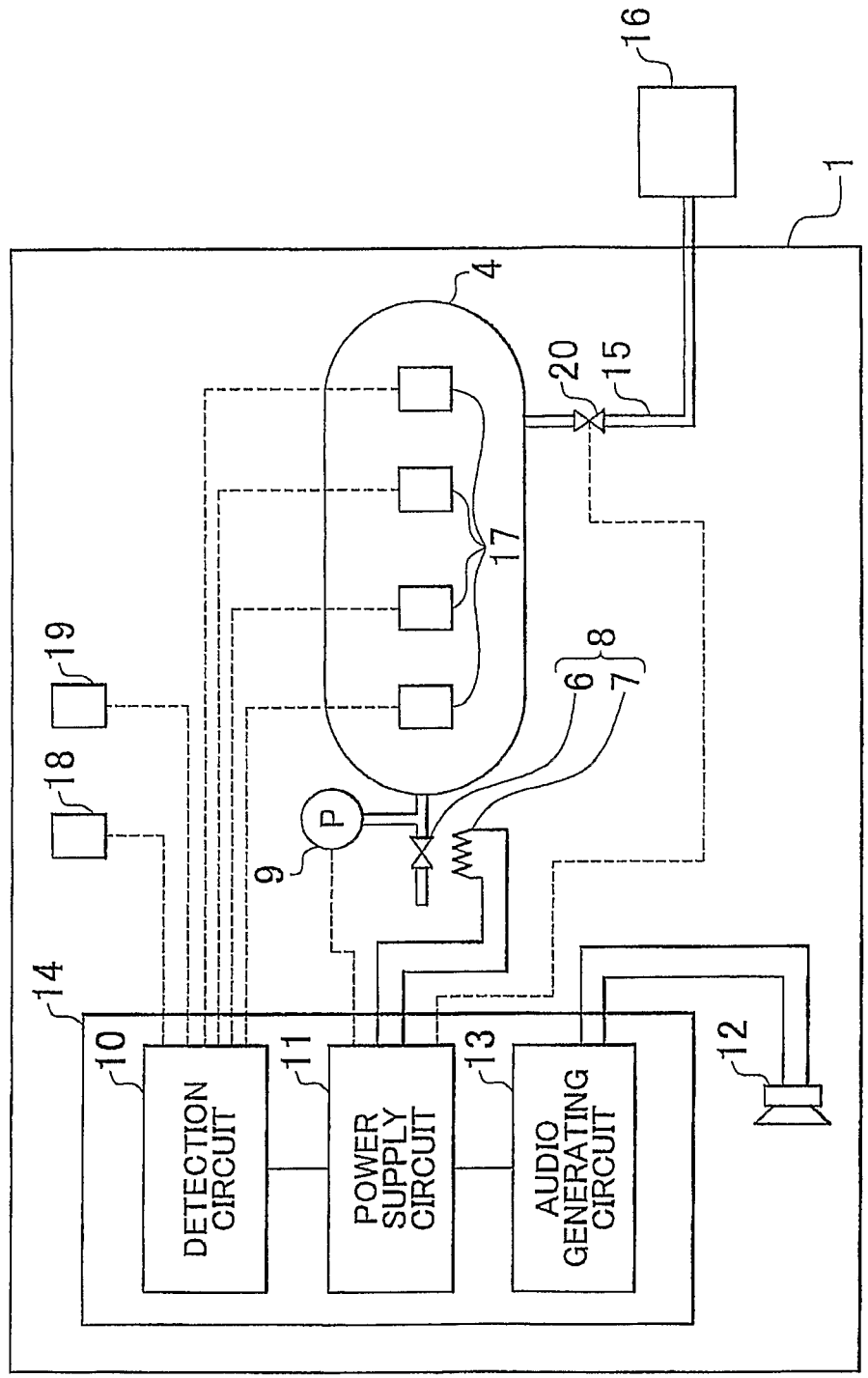
FIG. 5 is a schematic diagram of a tank system according to a modification of the first embodiment.

Further, as shown in FIG. 5, a configuration may be adopted in which, thermistors 17 are respectively provided in at least two locations on the surface of the high-pressure tank 4 instead of the heat-fusible conductive wire 5 or with the heat-fusible conductive wire 5. The temperatures of the respective thermistors 17 are compared with each other and if there is a difference between the temperatures detected by the respective thermistors 17 (for example, if a temperature difference between the respective thermistors 17 has exceeded an predetermined threshold), it is determined that a temperature increase has occurred in at least a part of the high-pressure tank 4. This is a detection that focuses attention on the fact that the temperature distribution across the surface of the high-pressure tank 4 does not become uniform if a local temperature increase occurs in the high-pressure tank 4. That is, if the thermistors 17 are provided at multiple locations on the surface of the high-pressure tank 4, a variation in temperature distribution due to such a local temperature increase can be detected. A local temperature increase is determined to have occurred in the high-pressure tank 4 if a variation occurs in the temperature distribution across the surface of the high-pressure tank 4. This makes it possible to detect a temperature increase in at least a part of the high-pressure tank without being affected by the outside temperature.

Further, a configuration may be adopted in which the tank system further includes an acceleration sensor 18 that detects any collisions of the vehicle 3, and the acceleration sensor 18 is connected to the detection circuit 10. If the acceleration sensor 18 detects an acceleration at that time of collision of the vehicle 3, the detection sensitivity may be increased by changing the threshold of the resistance value of the heat-fusible conductive wire 5, or the detection temperature of the thermistor 17 or the like. This makes it possible to detect a temperature increase in the high-pressure tank at an earlier stage. With respect to the heat-fusible conductive wire 5, the detection sensitivity may be increased by lowering the threshold of the resistance value that serves as the reference when detecting wire breakage. With respect to the thermistors 17, the detection sensitivity may be increased by lowering the threshold of the temperature difference between the respective thermistors, which serves as the reference when detecting a temperature increase in the high-pressure tank 4.

Further, a configuration may be adopted in which a temperature sensor 19 is provided to serve as a temperature sensing means for detecting the temperature of at least a part of the vehicle 3 (for example, the temperature of the fuel cell or drive motor, the oil temperature of brake oil, the temperature within the cabin, or the like), and it is determined that a temperature increase has occurred in at least a part of the high-pressure tank 4 if a temperature higher than a predetermined temperature is detected by the temperature sensor 19. Here, the predetermined temperature refers to a high temperature that could not be reached if the fuel cell, the drive motor, and the like were operating normally. This makes it possible to detect a temperature increase in the high-pressure tank at an early stage.

While decompression of the high-pressure tank 4 is achieved by opening of the fusible plug valve 6 in the first embodiment, the present invention is not limited to this. That is, it is also possible to supply a gas in the high-pressure tank 4 to the downstream side by opening or increasing the opening of a valve 20 provided on the path 15 leading to the fuel cell 12 and located on the downstream side of the high-pressure tank 4, thereby reducing the pressure in the high-pressure tank 4. This enables effective use of the gas released when decompressing the high-pressure tank 4, thereby making it possible to reduce the loss of gas.

The second embodiment of the present invention will now be described. Components and control flow processes serving functions equivalent to those of the components described above are denoted by the same reference numerals, and detailed description thereof is not repeated.

Figure 6:
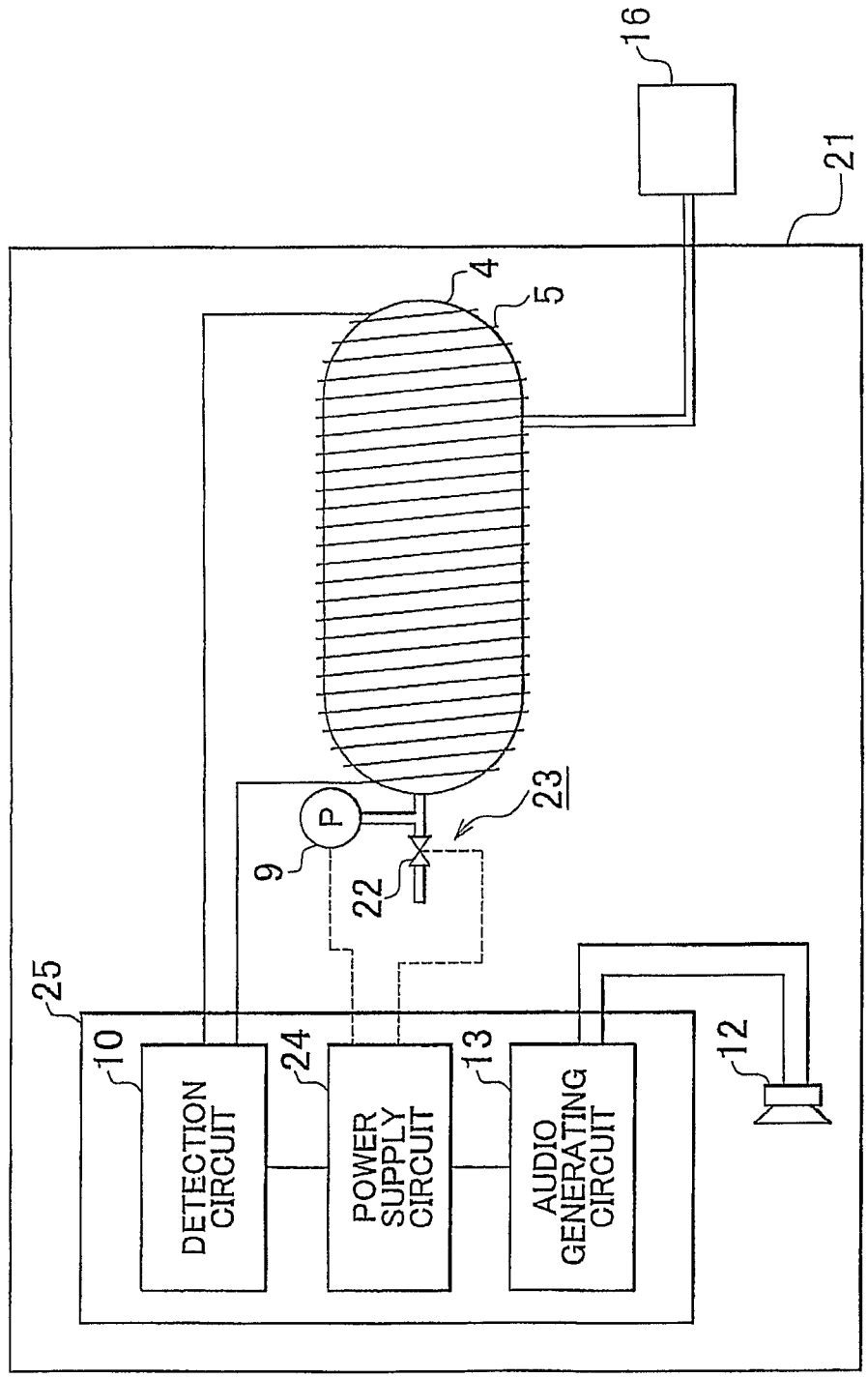
FIG. 6 is a schematic diagram of a tank system according to the second embodiment.

FIG. 6 shows the schematic configuration of a tank system 21 according to the second embodiment. While the first embodiment adopts the decompression device 8 that decompresses the high-pressure tank 4 by fusing the fusible plug valve 6 by the electric heater 7, the second embodiment adopts a decompression device 23 that decompresses the high-pressure tank 4 by opening and closing an electromagnetic valve 22, instead of using the fusible plug valve 6. Further, the electromagnetic valve 22 is electrically connected with a power supply circuit 24, and opened and closed by means of a signal from the power supply circuit 24. This eliminates the need for providing the electric heater 7.

Figure 7:
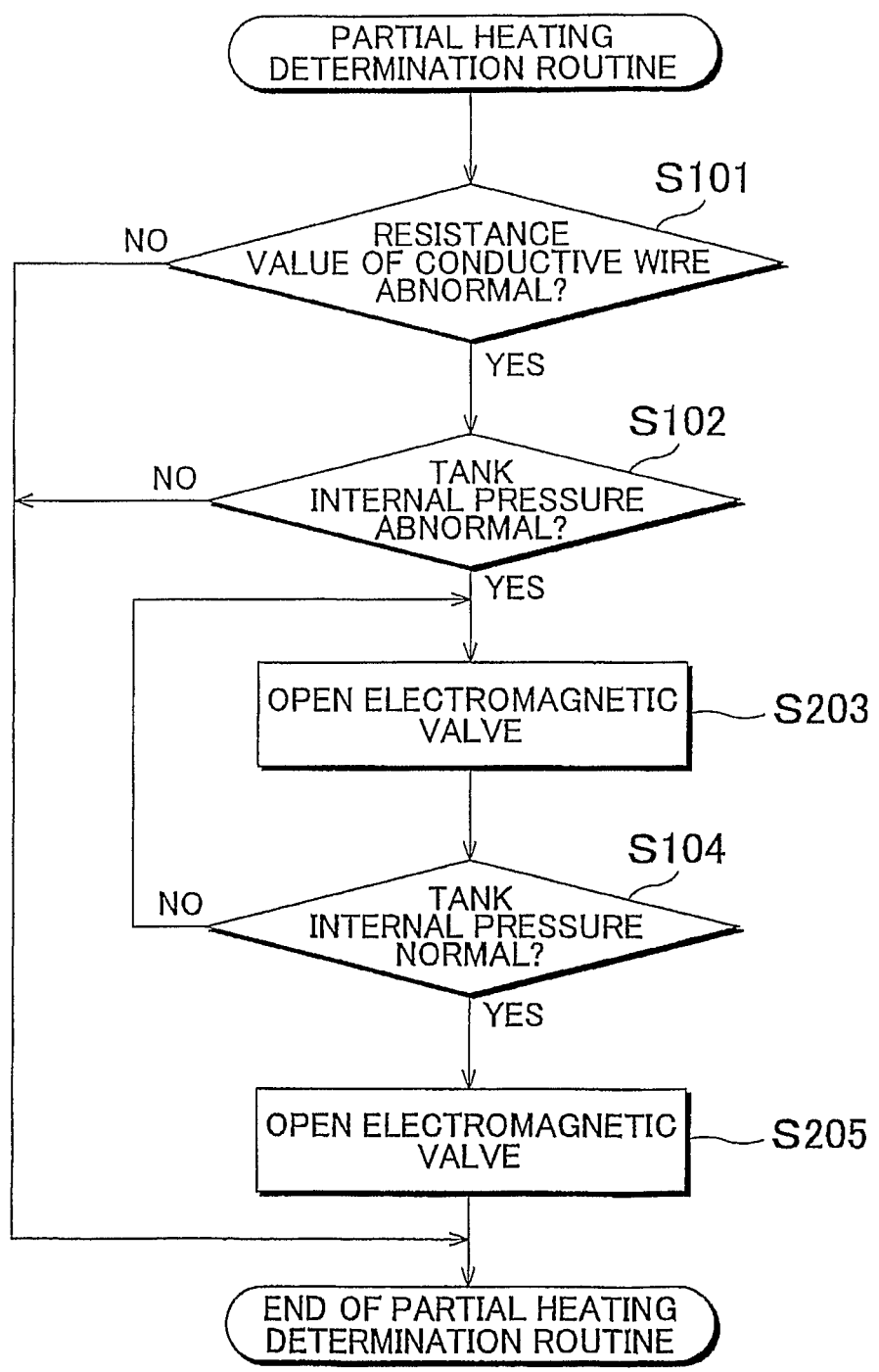
FIG. 7 is a control flow chart of the tank system according to the second embodiment.
Figure 8:
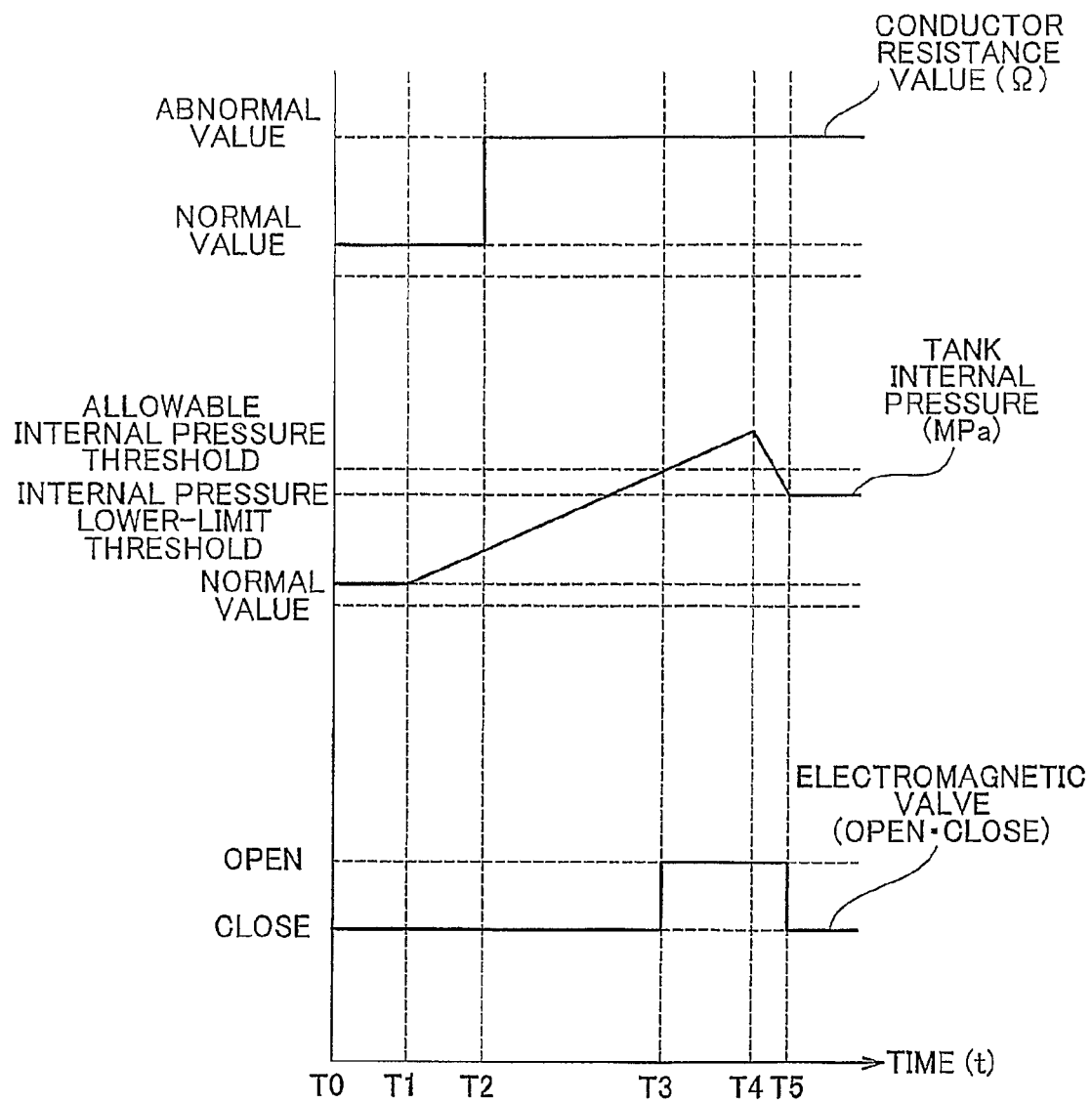
FIG. 8 is a graph showing how the resistance value of a heat-fusible conductive wire, the internal pressure of a high-pressure tank, and the energization state of an electronic valve change with the passage of time in the tank system according to the second embodiment.

FIG. 7 is a flow chart showing the control of the tank system 21 according to the second embodiment. FIG. 8 is a graph showing how the resistance value of the heat-fusible conductive wire 5, the internal pressure of the high-pressure tank 4, and the open/closed state of the electromagnetic valve 22 change over time.

Of the control flow for the tank system 21 according to the second embodiment, the processes up to step S102 are the same as those of the first embodiment described above.

Upon determining in step S102 that decompression of the tank is necessary, a control device 25 sends a signal to the electromagnetic valve 22 to open the electromagnetic valve 22 (T3), and also causes an alert sound to be produced from the speaker 12 (S203). When the electromagnetic valve 22 is opened, decompression of the high-pressure tank 4 is started (T4).

After opening the electromagnetic valve 22, the control device 25 checks the internal pressure of the high-pressure tank 4 by means of the electric pressure gauge 9 (S104). If the internal pressure of the high-pressure tank 4 is exceeds a second threshold pressure (internal pressure lower-limit threshold), the control device 25 keeps the electromagnetic valve 22 open (S203). On the other hand, if the internal pressure of the high-pressure tank 4 is equal to or lower than the second threshold pressure, the control device 25 closes (T5) the electromagnetic valve 23 (S205). It should be noted that the second threshold pressure refers to a pressure in the high-pressure tank 4, and defined in the second embodiment as a pressure that does not likely to cause the tank to rupture even if a local temperature increase occurs in only a part of the high-pressure tank 4 in a state with the internal pressure of the high-pressure tank 4 maintained.

According to the second embodiment, release of the gas from the high-pressure tank 4 is stopped when the internal pressure of the high-pressure tank 4 becomes equal to or lower than the second threshold pressure, thereby making it possible to prevent unnecessary release of the contents of the tank.

According to the respective example embodiments of the present invention, it is possible to detect a temperature increase in at least a part of the high-pressure tank, and reduce the pressure in the tank without being affected by the outside air temperature.

The invention claimed is:

1. A tank system mounted in a vehicle comprising:
a high-pressure tank;
a detection device that detects a temperature increase in at least a portion of the high-pressure tank;
a decompression device that decompresses the high-pressure tank; and
a control device that controls the decompression device to decompress the high-pressure tank when a temperature increase in the at least a portion of the high-pressure tank is detected by the detection device,
a temperature sensing device that detects a temperature in at least a part of the vehicle,
wherein the control device increases detection sensitivity of the detection device when the temperature detected by the temperature sensing device exceeds a predetermined temperature.

2. The tank system according to claim 1, wherein the detection device detects the temperature increase in the at least a portion of the high-pressure tank from a temperature of the high-pressure tank at more than two locations.

3. The tank system according to claim 1, wherein the at least a portion of the high-pressure tank includes a surface of the high-pressure tank or a vicinity of the surface of the high-pressure tank.

4. The tank system according to claim 1, wherein the detection device includes a heat-fusible conductive wire that surrounds the periphery of the high-pressure tank, and when the heat-fusible conductive wire is broken, the detection device detects that the temperature increased in the at least a portion of the high-pressure tank.

5. The tank system according to claim 1, wherein the detection device has at least two thermistors arranged on a surface of the high-pressure tank, and the detection device compares temperatures detected by the thermistors, detects that the temperature increased in the at least a portion of the high-pressure tank when there is a difference in temperature between the detected temperatures.

6. The tank system according to claim 1, wherein the detection device detects that the temperature increased in the at least a portion of the high-pressure tank if a difference in the detected temperatures exceeds a predetermined value.

7. The tank system according to claim 1, wherein the tank system is mounted in a vehicle, further comprising:

a collision sensing device that detects a collision of the vehicle, wherein the control device increases detection sensitivity of the detection device when the collision sensing device detects a collision of the vehicle.

8. The tank system according to claim 1, further comprising:

a pressure sensing device that detects a pressure in the high-pressure tank, wherein the decompression of the high-pressure tank occurs when both a temperature increase in the at least a portion of the high-pressure tank is detected and the detected pressure is equal to or higher than a first threshold pressure.

9. The tank system according to claim 1, wherein the control device controls the decompression device to stop the decompression of the high-pressure tank when the detected internal pressure is equal to or lower than a second threshold pressure.

10. The tank system according to claim 1, wherein the decompression device has a fusible plug valve, and a heating device that heats the fusible plug valve, and the control device decompresses the high-pressure tank by heating the fusible plug valve to fuse the fusible plug valve.

* * * * *

UNITED STATES PATENT AND TRADEMARK OFFICE
CERTIFICATE OF CORRECTION

PATENT NO. : 8,627,841 B2
APPLICATION NO. : 12/307501
DATED : January 14, 2014
INVENTOR(S) : Shuji Hirakata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this
Twenty-second Day of September, 2015

Michelle K. Lee
*Director of the United States Patent and Trademark Office*